United States Patent
Witt et al.

(10) Patent No.: US 10,912,104 B2
(45) Date of Patent: Feb. 2, 2021

(54) INTERLEAVED, STATIC TIME DIVISION MULTIPLE ACCESS (TDMA) FOR MINIMIZING POWER USAGE IN DELAY-SENSITIVE APPLICATIONS

(71) Applicant: Schweitzer Engineering Laboratories, Inc., Pullman, WA (US)

(72) Inventors: Stephen F. Witt, Skokie, IL (US); Patricia Gilfeather, Spokane, WA (US); Jeff Bassett, Elgin, IL (US); Prajakta Apte, Lake Zurich, IL (US); Anatoliy V. Kozlov, Spokane, WA (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 28 days.

(21) Appl. No.: 16/265,666

(22) Filed: Feb. 1, 2019

(65) Prior Publication Data
US 2020/0252947 A1    Aug. 6, 2020

(51) Int. Cl.
*H04W 72/12*    (2009.01)
*H04W 72/04*    (2009.01)
*H02J 13/00*    (2006.01)

(52) U.S. Cl.
CPC ..... *H04W 72/121* (2013.01); *H02J 13/00007* (2020.01); *H04W 72/0446* (2013.01)

(58) Field of Classification Search
CPC .............. H04W 72/121; H04W 72/0446
See application file for complete search history.

(56) References Cited

U.S. PATENT DOCUMENTS

| | | |
|---|---|---|
| 5,160,926 A | 11/1992 | Schweitzer, III |
| 5,557,284 A | 9/1996 | Hartman |
| 5,737,715 A | 4/1998 | Deaton |
| 5,862,186 A | 1/1999 | Kumar |
| 6,144,334 A | 11/2000 | Claffey |
| 6,229,479 B1 | 5/2001 | Kozlov |
| 6,393,273 B1* | 5/2002 | Anderson ............. H04L 1/1685 370/346 |
| 6,483,856 B1 | 11/2002 | Bird |
| 6,901,242 B2 | 5/2005 | Kroeger |

(Continued)

FOREIGN PATENT DOCUMENTS

| | | |
|---|---|---|
| WO | 9747987 | 12/1997 |
| WO | 2012151006 | 11/2012 |
| WO | 2014005016 | 1/2014 |

*Primary Examiner* — Mohammad S Anwar
(74) *Attorney, Agent, or Firm* — Bradley W. Schield; Fletcher Yoder, P.C.

(57) ABSTRACT

The present disclosure relates to an interleaved, static time division multiple access (TDMA) for communicating in a power delivery system. For example, an access point may communicate with a plurality of electronic devices in the power delivery system. The access point may send a first signal indicating a first poll to a first group of devices in the power delivery system to allow the first group of devices to communicate data to the access point during assigned time slots of the first group of devices. The access point may send a second signal indicating a second poll to a second group of devices, separate from the first group of devices, in the power delivery system to allow the second group of devices to communicate data to the access point during assigned time slots following the second poll.

17 Claims, 7 Drawing Sheets

(56) References Cited

U.S. PATENT DOCUMENTS

| | | |
|---|---|---|
| 7,146,516 B2 | 12/2006 | Dhupar |
| 7,375,683 B2 | 5/2008 | Smith |
| 7,398,411 B2 | 7/2008 | Zweigle |
| 7,436,232 B2 | 10/2008 | Sivero |
| 7,440,427 B1 | 10/2008 | Katz |
| 7,729,405 B2 | 6/2010 | Inoue |
| 7,940,213 B2 | 5/2011 | Harper |
| 7,952,519 B1 | 5/2011 | Nielsen |
| 7,978,130 B1 | 7/2011 | Cohen |
| 7,979,228 B2 | 7/2011 | Zurbuchen |
| 8,055,288 B2 | 11/2011 | Ladd |
| 8,138,972 B2 | 3/2012 | Underbrink |
| 8,159,391 B2 | 4/2012 | Papadimitratos |
| 8,237,609 B2 | 8/2012 | Talbot |
| 8,325,087 B2 | 12/2012 | Thomson |
| 8,326,319 B2 | 12/2012 | Davis |
| 8,446,896 B2 | 5/2013 | Bedrosian |
| 8,564,330 B1 | 10/2013 | Radulov |
| 8,655,608 B2 | 2/2014 | Guzman-Casillas |
| 9,083,503 B2 | 7/2015 | Sagen |
| 9,270,442 B2 | 2/2016 | Rice |
| 10,161,986 B2 | 12/2018 | Schweitzer |
| 2002/0158693 A1 | 10/2002 | Soong |
| 2003/0087654 A1 | 5/2003 | Wheeler |
| 2003/0107513 A1 | 6/2003 | Abraham |
| 2004/0062279 A1 | 4/2004 | Primrose |
| 2004/0166879 A1 | 8/2004 | Meadows |
| 2004/0228368 A1 | 11/2004 | Jecmen |
| 2006/0259806 A1 | 11/2006 | Zweigle |
| 2007/0132773 A1 | 6/2007 | Plante |
| 2007/0194987 A1 | 8/2007 | Fedora |
| 2007/0294392 A1* | 12/2007 | Balasubramanian ... G06F 9/542 709/224 |
| 2008/0169978 A1 | 7/2008 | Powell |
| 2008/0186229 A1 | 8/2008 | Van Diggelen |
| 2008/0198069 A1 | 8/2008 | Gronemeyer |
| 2009/0117928 A1 | 5/2009 | Ladd |
| 2009/0160705 A1 | 6/2009 | Matsuzaki |
| 2009/0315764 A1 | 12/2009 | Cohen |
| 2010/0030916 A1 | 2/2010 | Greenwood Graham |
| 2010/0034190 A1 | 2/2010 | Yun |
| 2010/0073228 A1 | 3/2010 | Smith |
| 2010/0117899 A1 | 5/2010 | Papadimitratos |
| 2010/0190509 A1 | 7/2010 | Davis |
| 2010/0222068 A1 | 9/2010 | Gaal |
| 2010/0231448 A1 | 9/2010 | Harper |
| 2010/0253578 A1 | 10/2010 | Mantovani |
| 2010/0254225 A1 | 10/2010 | Schweitzer, III |
| 2011/0001485 A1* | 1/2011 | Feight ............... H02J 1/10 324/500 |
| 2011/0001668 A1 | 1/2011 | Cobb |
| 2011/0035066 A1 | 2/2011 | Schweitzer |
| 2011/0068973 A1 | 3/2011 | Humphreys |
| 2011/0085540 A1 | 4/2011 | Kuwabara |
| 2011/0102258 A1 | 5/2011 | Underbrink |
| 2011/0102259 A1 | 5/2011 | Ledvina |
| 2011/0169577 A1 | 7/2011 | Nicholls |
| 2011/0181466 A1 | 7/2011 | Serrano |
| 2011/0227787 A1 | 9/2011 | Gum |
| 2011/0261917 A1 | 10/2011 | Bedrosian |
| 2011/0285586 A1 | 11/2011 | Ferguson |
| 2011/0287779 A1 | 11/2011 | Harper |
| 2012/0005326 A1 | 1/2012 | Bradetich |
| 2012/0026037 A1 | 2/2012 | Thomson |
| 2012/0030495 A1 | 2/2012 | Chandhoke |
| 2012/0066418 A1 | 3/2012 | Foster |
| 2012/0116677 A1 | 5/2012 | Higgison |
| 2012/0179404 A1 | 7/2012 | Lee |
| 2012/0182181 A1 | 7/2012 | Dai |
| 2012/0195253 A1 | 8/2012 | Irvine |
| 2012/0195350 A1 | 8/2012 | Das |
| 2012/0323397 A1 | 12/2012 | Schweitzer, III |
| 2013/0157593 A1 | 6/2013 | Achanta |
| 2013/0244624 A1 | 9/2013 | Das |
| 2013/0328606 A1 | 12/2013 | Ravi |
| 2013/0335266 A1 | 12/2013 | Vollath |
| 2014/0003199 A1 | 1/2014 | Dougan |
| 2014/0094218 A1 | 4/2014 | Hammes |
| 2014/0100702 A1 | 4/2014 | Schweitzer |
| 2014/0250972 A1 | 9/2014 | Achanta et al. |
| 2014/0293494 A1* | 10/2014 | Allen ............... H02H 1/0061 361/93.1 |
| 2014/0307653 A1* | 10/2014 | Liu ............... H04W 74/006 370/329 |
| 2014/0334477 A1 | 11/2014 | Stahlin |
| 2018/0287658 A1 | 10/2018 | Cosic |
| 2019/0341811 A1* | 11/2019 | Elliott ............... H02J 50/80 |

* cited by examiner

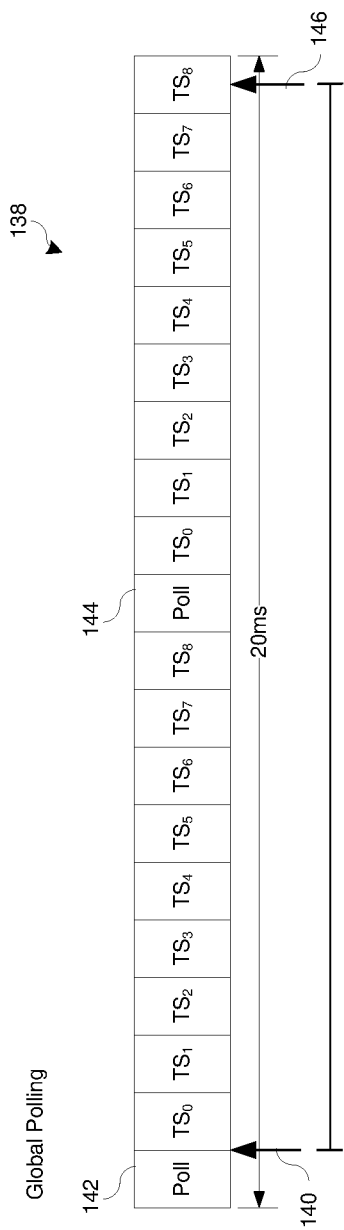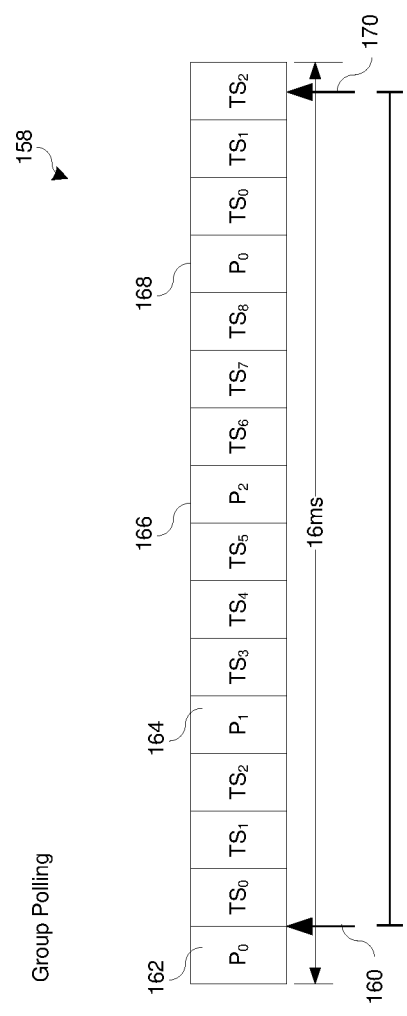
FIG. 3
FIG. 4

INTERLEAVED, STATIC TIME DIVISION MULTIPLE ACCESS (TDMA) FOR MINIMIZING POWER USAGE IN DELAY-SENSITIVE APPLICATIONS

TECHNICAL FIELD

The present disclosure relates generally to channel access and, more particularly, an interleaved, static time division multiple access (TDMA) communication network in electric power delivery systems.

BRIEF DESCRIPTION OF THE DRAWINGS

Non-limiting and non-exhaustive embodiments of the disclosure are described herein, including various embodiments of the disclosure with reference to the figures listed below.

FIG. 3 illustrates a time diagram of the communication network of FIG. 1 that uses global polling, in accordance with an embodiment.

FIG. 4 illustrates a time diagram of the communication network of FIG. 1 that uses group polling, in accordance with an embodiment.

DETAILED DESCRIPTION OF SPECIFIC EMBODIMENTS

Figure 1:
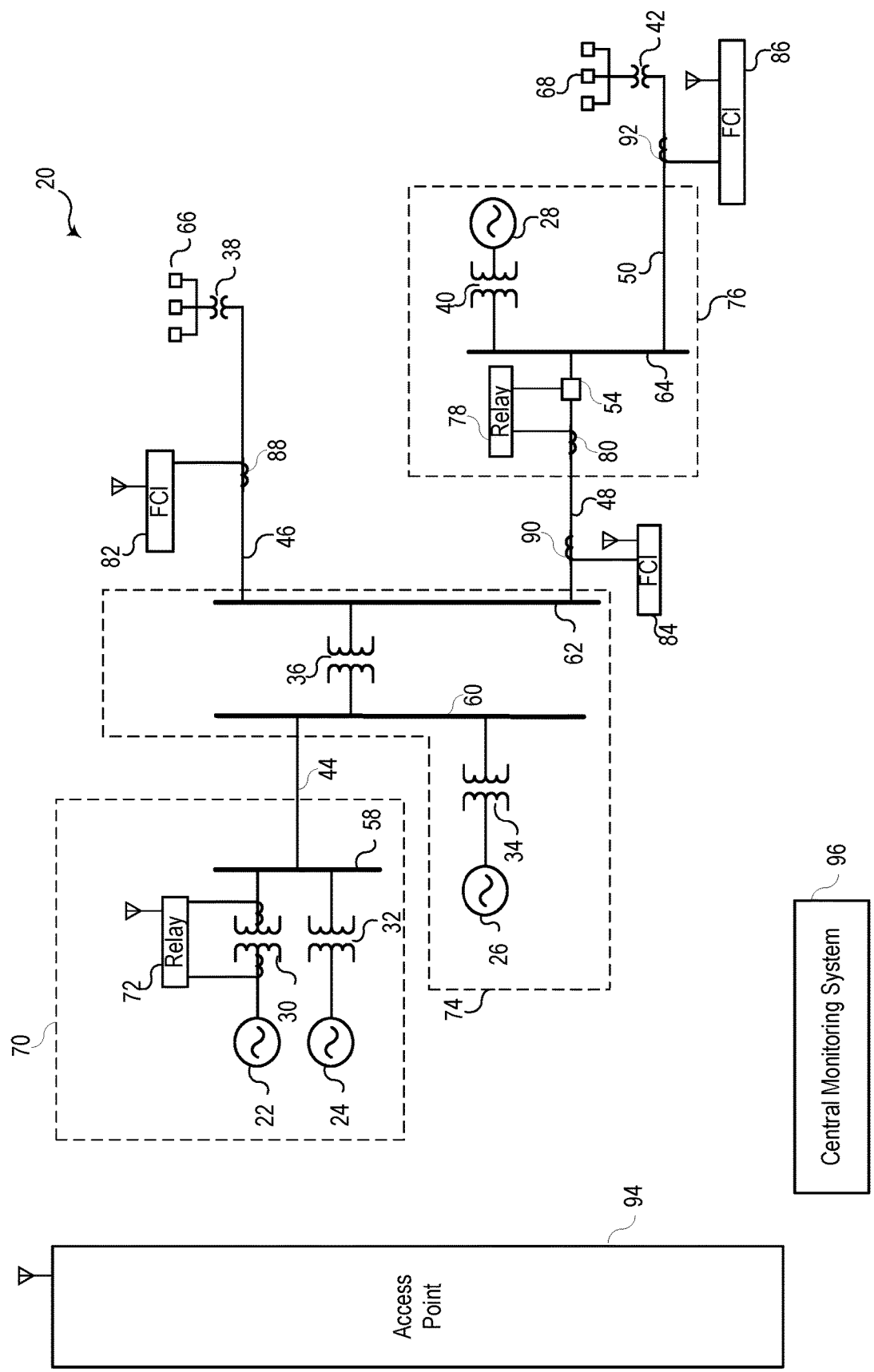
FIG. 1 illustrates a block diagram of an electric power delivery system that uses a communication network to communicate power system data between electronic devices and an access point, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Electric power delivery systems are used to distribute electric power from electric power generation sources to loads. Such systems may include generators or other sources, transformers that step up or down voltages, transmission lines, buses, distribution lines, voltage regulators, capacitor banks, reactors, circuit breakers, switches, and other such equipment. Electric power delivery equipment may be monitored, automated and/or protected using intelligent electronic devices (IEDs).

IEDs may communicate with an access point to transmit power system data, settings, circuit breaker statuses, and firmware updates, among others. To communicate with the access point, the IEDs may use various techniques to avoid collisions with other IEDs transmitting to the access point during the same period of time, such as carrier sense multiple access (CSMA). Some of these techniques may listen for an open channel to transmit data. However, such techniques may have collisions because the IEDs may be within communication range of the access point but outside the communication range of each other. Collisions may use extra power and may cause network delays. Further, data communicated in power systems may be delay sensitive, such as communication of faults in the power system. Additionally, some IEDs may operate with limited power. As such, there is a need to communicate data in communication networks for power systems that reduces or eliminates collisions and/or limits power consumption.

An interleaved, static time-division multiple access (TDMA) network may be used to limit power usage by IEDs on an electric power delivery system and provide for a bounded delay in communicating power system data. For example, the access point may send a poll in which each device has an assigned time to respond to reduce or eliminate collisions. Further, by grouping the IEDs into groups and sending polls to each of the groups, the network may have a shorter bounded delay in communicating event notifications. That is, by splitting the devices into groups and polling smaller groups of devices in each poll, notifications of events at devices in each of the groups may be communicated during the polling responses of the associated group, which may reduce the amount of time to communicate such messages.

For example, an access point may send a first poll at a first time to a first group of devices to allow the first group of devices to communicate data to the access point. Then, the access point may send a second poll at a second time to a second group of devices to allow the second group of devices to communicate data to the access point. The access device may then send a third poll at a third time to the first group of devices to allow the first group of devices another opportunity to communicate data to the access point. If an event were to be detected by a device in the first group after the first poll, the device in the first group may communicate an indication of the event. That is, the bounded delay of communicating an event may be approximately the time of a polling cycle (i.e., where each device is polled) and a group poll, in this case, of the first group.

FIG. 1 is a simplified one-line diagram of an alternating current (AC) electric power delivery system 20 consistent with embodiments of the present disclosure. The electric power delivery system 20 may be configured to generate, transmit, and distribute electric energy to loads. The electric power delivery system 20 may include equipment, such as electric generators 22, 24, 26, and 28, power transformers 30, 32, 34, 36, 38, 40 and 42, power transmission and distribution lines 44, 46, 48, and 50, a circuit breaker 54, buses 58, 60, 62, and 64, loads 66 and 68, and the like. A variety of other types of equipment may also be included in the electric power delivery system 20, such as voltage regulators, capacitor banks, and a variety of other types of equipment.

A first substation 70 may include the electric generators 22 and 24 feeding the bus 58 via respective transformers 30 and 32. The transformer 30 may be monitored and protected using an IED 72, such as a relay. A second substation 74 may include the electric generator 26, which may be a distributed generator, and which may be connected to bus 60 through the step-up transformer 34. The bus 58 may be connected to the bus 60 via the transmission line 44. The bus 60 may be connected to a distribution bus 62 via a step-down transformer 36. The distribution lines 46 and 48 may be connected to distribution bus 62. The load 66 may be fed from distribution line 46. The step-down transformer 38 may be in communication with distribution bus 62 via distribution line 46 and may be used to step down a voltage for consumption by the load 66.

The distribution line 48 may lead to substation 76, and deliver electric power to the bus 64. The bus 64 may also receive electric power from distributed generator 28 via the transformer 40. The distribution line 50 may deliver electric power from the bus 64 to the load 68, and may include further step-down transformer 42. The circuit breaker 54 may be controlled by an IED 78, such as a relay, that detects current on the distribution line, via a current transformer 80, and controls the circuit breaker 54 based on the detected current.

The electric power delivery system 20 may include electronic devices, such as faulted circuit indicators (FCIs) 82, 84, and 86, that monitor the power lines 46, 48, and 50 to detect events in the electric power delivery system 20. The FCIs 82, 84, and 86 may each include a respective current transformer (CT) 88, 90, and 92 that detects current through the distribution line 46, 48, and 50. Further, each of the FCIs 82, 84, and 86 may harvest power, via the current transformer 88, 90, and 92 from the power lines 46, 48, and 50 to power the FCI. The power harvested may be limited, for example, by the hardware of the FCI and the current on the power line.

Each of the FCIs 82, 84, and 86 may communicate with an access point 94, such as a fault and load receiver (FLR). For example, the FCIs 82, 84, and 86 may provide power system data, such as current measurements detected on the power line, event notifications, and the like. The access point 94 may communicate the power system data to a central monitoring station 96. Some techniques to communicate between the access point 94 and the FCIs 82, 84, and 86 may involve each FCI 82, 84, and 86 listening for an open channel to transmit data. However, such techniques may have "hidden" devices that are outside of the communication range of other devices.

Figure 2:
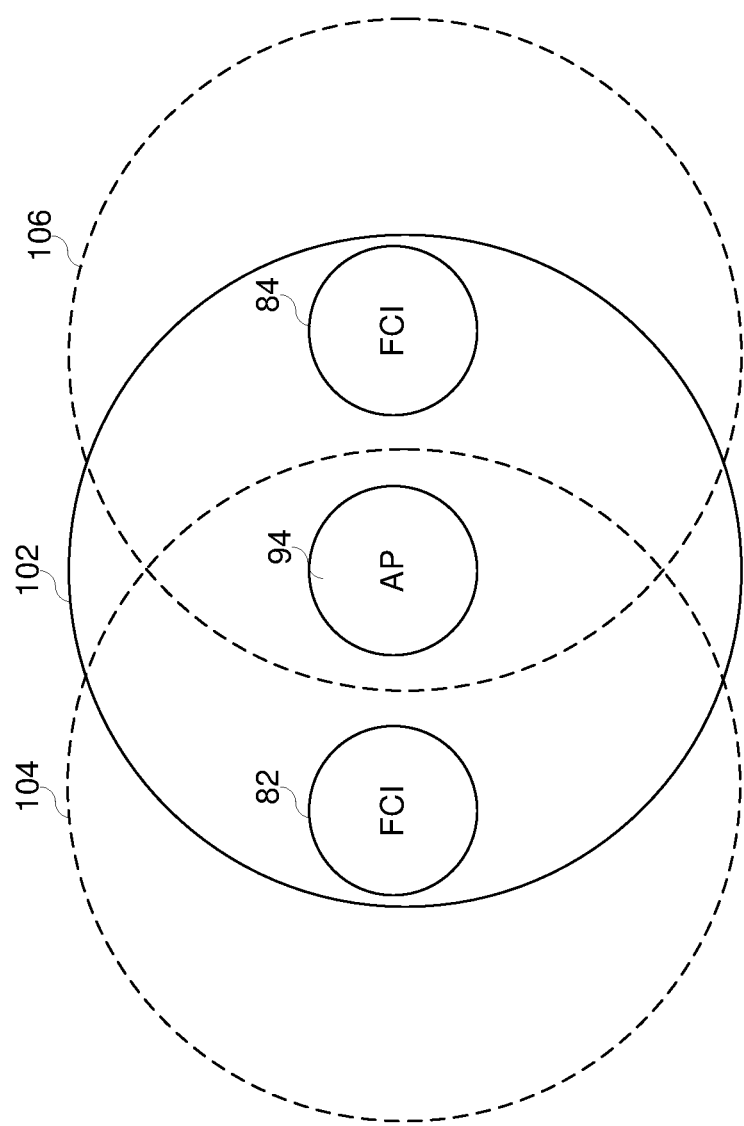
FIG. 2 illustrates a network diagram of the communication network of FIG. 1, in accordance with an embodiment.

FIG. 2 is a network diagram of the access point 94 in communication with FCIs 82 and 84, in accordance with an embodiment. The access point 94 may have a wireless communication range 102 that allows the access point 94 to communicate with each FCI 82 and 84. The FCI 82 may have a wireless communication range 104 that allows the FCI 82 to communicate with the access point 94, and the FCI 84 may have a wireless communication range 106 that allows the FCI 84 to communicate with access point 94. In the illustrated embodiment, FCI 82 may not be within range to detect when FCI 84 is communicating and vice versa. When using a CSMA network, the FCI 82 may overlap communication with FCI 84 because the FCI 82 may not detect communication from FCI 84.

FIG. 3 is time diagram 138 of the communication network in which the devices and the access point 94 communicate in a time division multiple access (TDMA) network, in accordance with an embodiment. In the TDMA network, the devices are assigned devices to time slots $TS_0$-$TS_8$ to communicate at offset times from each other to reduce or eliminate collisions and to limit power consumption. The access point 94 may send a poll 144 to each of the electronic devices. Each device in the network may then communicate at an assigned timeslot following the poll. For example, after the poll 144 is sent by the access point 94, a first electronic device may communicate data at time slot $TS_0$, a second electronic device may communicate data at time slot $TS_1$, a third electronic device may communicate data at time slot $TS_2$, and so on, until each electronic device in the network has been given an opportunity to respond at an assigned time slot following receiving the poll. The access point 94 may then send another poll 144 to poll each of the devices in the network.

However, the data being communicated with the access point 94 may be time sensitive. For example, during an event, such as an overcurrent event, undercurrent event, current-over-time event, undervoltage event, overvoltage event, or the like, it may be desirable to communicate a notification of the event within a period of time. In the illustrated embodiment of FIG. 3, the bounded delay may be a situation where the FCI assigned to the last time slot $TS_8$ detects an event, at time 140, after the first poll 142 is communicated. In this example, the FCI assigned to the time slot $TS_8$ may begin listening for a poll after detecting the event at time 140. Because the first poll 142 has already been transmitted, the FCI may continue listening until the next poll 144. Further, since the FCI is assigned to the last time slot $TS_8$, the FCI may not communicate until near the end of the second poll, at the assigned time slot $TS_8$ of time 146. That is, the bounded time delay may be nearly two polling cycles.

To ensure that the data is communicated with a shorter bounded delay, as explained below, the IEDs may be divided into groups with shorter polling intervals. By dividing the IEDs into groups, the bounded delay in which it takes to communicate an event detected by the IED may be shorter than the illustrated embodiment in FIG. 3.

FIG. 4 is a time diagram 158 of a communication network in which the devices and the access point 94 communicate in groups in a TDMA network. The devices may be FCIs, relays, or any other suitable IEDs within a power delivery system. Each device may be assigned a time slot. For example, the first time slot $TS_0$ may be assigned to a first FCI, the second time slot $TS_1$ may be assigned to a second FCI, and so on. The access point 94 may send, at a first poll time $P_0$, a signal indicating a first poll request in which a first group of devices may communicate with the access point 94. After receiving the first poll request at time $P_0$, the FCI assigned to time slot $TS_0$ may communicate with the access point 94 during the first time slot $TS_0$. The FCI assigned to time slot $TS_1$ may wait until the assigned time slot $TS_1$ and communicate with the access point 94 during the assigned time slot $TS_1$. Similarly, the FCI assigned to time slot $TS_2$ may wait until the assigned time slot $TS_2$ and communicate with the access point 94 during the assigned time slot $TS_2$.

The access point 94 may send, at a second poll time Pi, a signal indicating a second poll request in which a second group of devices may communicate with the access point 94. The access point 94 may then receive signals from each of the FCIs in the second group. For example, the FCI assigned to time slot $TS_3$ may communicate with the access point 94 during the first time slot of the second group. Further, the FCI assigned to time slot $TS_4$ of the second group may receive a signal indicating the second poll indicating a poll of the second group of devices and wait until the second time slot of the second group to communicate data with the access point 94.

By dividing the FCIs into separate polling groups, the amount of time to communicate an indication of an event may be reduced. For example, average time to communicate an event and/or the bounded delay (e.g., worst-case time) to communicate an event may be reduced by allowing the access point 94 to poll each group separately to obtain data from each of the groups. Because polls are communicated more frequently, an FCI may detect a poll that allows the FCI to communicate within a shorter period of time.

In the illustrated embodiment of FIG. 4, the bounded delay may be a situation where the FCI assigned to the last time slot $TS_2$ in a first polling group detects an event at time 160 after the first poll $P_0$ 162. In this example, the FCI assigned to the time slot $TS_2$ may wait through group polls 164 and 166 until the next group poll 168 of the group in which the FCI is assigned. At time 170, the FCI assigned to time slot $TS_2$ may communicate an indication of the event to the access point 94. While the time 160 after the first poll is used as the time the event is detected, the bounded delay may include times during the poll where the FCI receives parts of the poll.

In the illustrated embodiments in FIGS. 3 and 4 there are 9 devices communicating with the access point 94. By dividing the devices into polling groups and including polls 162, 164, and 166 to each of the groups, the bounded delay may be reduced. In the illustrated example, if each communication (e.g., poll requests and poll responses) were to take a millisecond, the group polling bounded delay (e.g., 16 milliseconds) may be shorter than the bounded delay (e.g., 20 milliseconds) of global polling. Further, the average case polling time for group polling may be shorter than the average case polling time for global polling. That is, FCIs may communicate indications of an event to the access point faster by including group polls to groups of devices. While the illustrated embodiment uses certain numbers of devices, this is simply meant to be illustrative and various embodiments may include different total numbers of devices, different group sizes, and the like.

Figure 5:
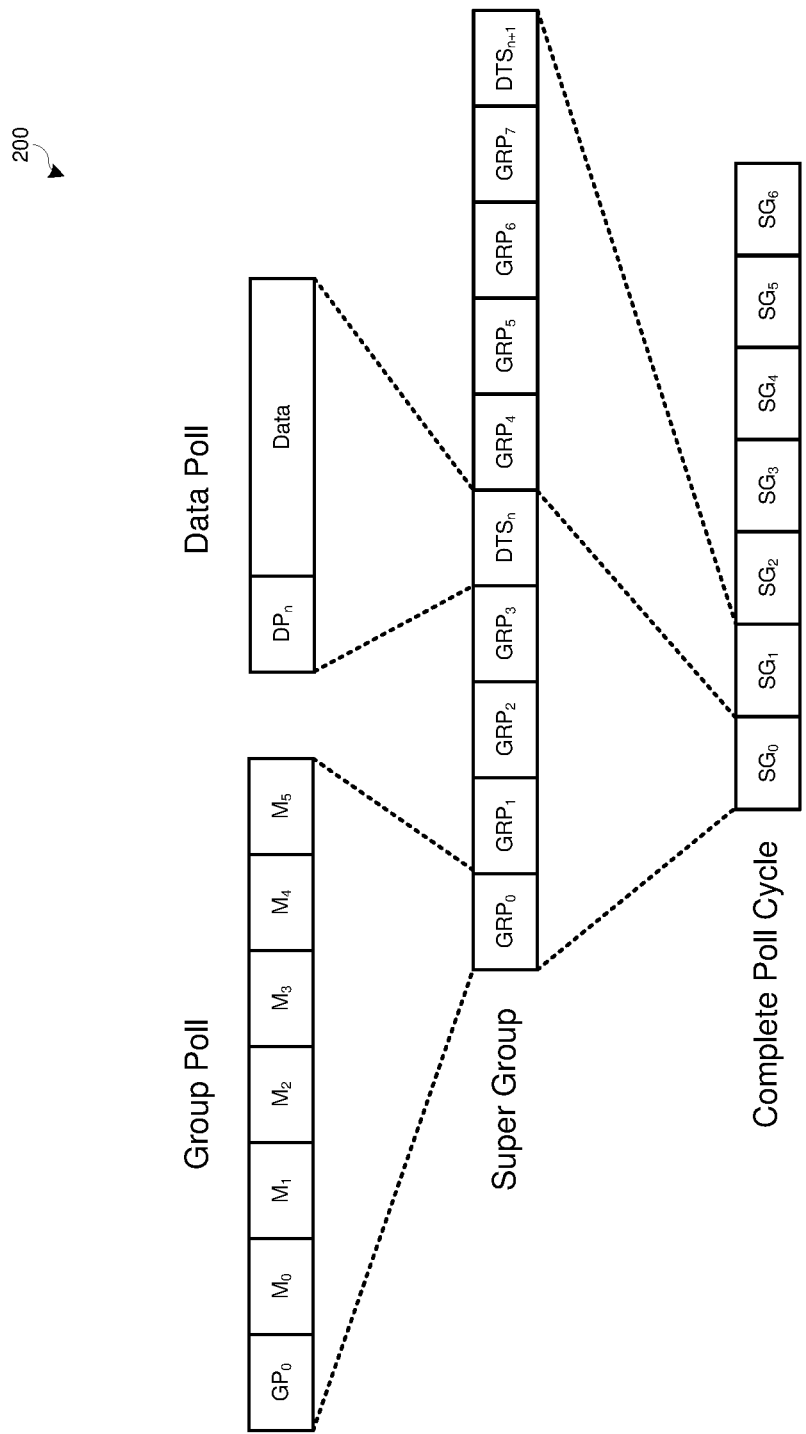
FIG. 5 illustrates another time diagram of the communication network of FIG. 1 in which sets of groups the devices are further grouped into supergroups, in accordance with an embodiment.

FIG. 5 is a time diagram 200 of the communication network using group polling in supergroups that allow for data polling of larger messages, in accordance with an embodiment. By communicating in time slots arranged according to group polling and supergroup polling, bounded delays and average-case delays may be reduced in communicating indications of events in the power delivery system 20 to be shorter than the bounded delay in global polling networks.

In the illustrated embodiment, the access point 94 may communicate a group poll request GP associated with each group of devices and listen to poll responses from each device in the communication network. Further, the groups of devices may be grouped into a supergroup. For example, a first set of groups of devices $GRP_0$-$GRP_3$ may be grouped into a first supergroup $SG_0$. A second set of groups of devices $GRP_4$-$GRP_7$ may be grouped into a second supergroup $SG_1$, and so on for supergroups $SG_2$-$SG_6$.

Furthermore, the access point 94 may communicate a data poll $DP_n$ to each supergroup $SG_0$-$SG_6$ following communication of poll requests $GP_0$-$GP_3$ and responses $M_0$-$M_{23}$ from each device in the supergroup. The data poll $DP_n$ may indicate a larger set of data than the time slots allocated to each device in the supergroup. For example, if a firmware update is desired to be communicated to the FCIs in supergroup $SG_0$, the access point 94 may send, in group polls in the supergroup, an indication that the data poll $DP_n$ will be followed by data of the firmware update. The access point 94 may then communicate the data poll $DP_n$ to indicate to the FCIs that the data of the firmware update will follow. In this manner, larger messages may be communicated to/from the FCIs during the data time slot. Each supergroup may have a data poll and a data time slot ($DTS_{n+1}$ . . . $DTS_{n+2}$ . . . etc.).

Figure 6:
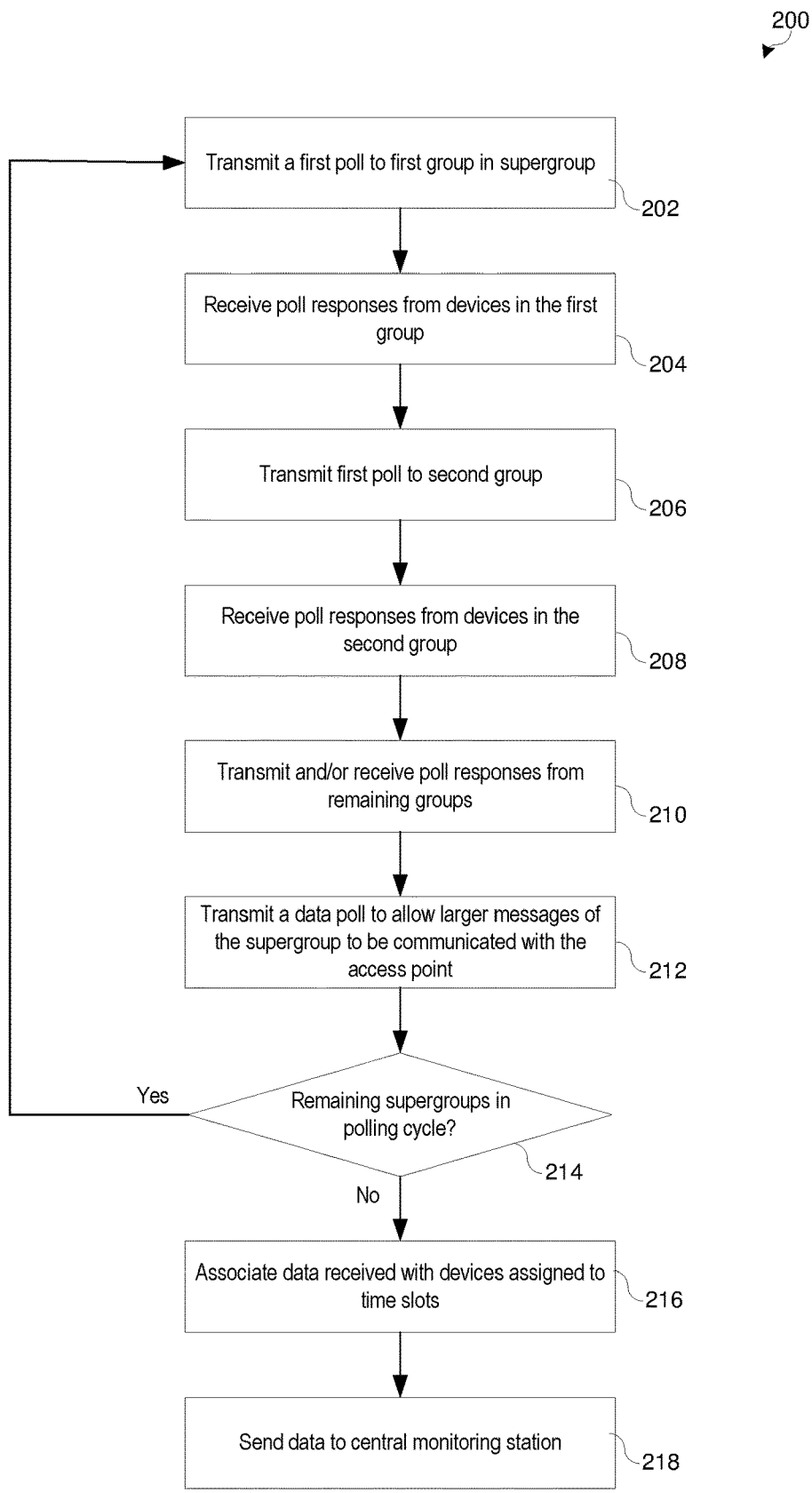
FIG. 6 illustrates a flow diagram of a process performed by the access point of FIG. 1, in accordance with an embodiment.

FIG. 6 is a flow diagram of a process 200 performed by the access point 94 to communicate with the devices of the power delivery system 20. The process 200 may be stored as instructions in the memory of the access point 94 to be executed by one or more processor(s) of the access point 94. The access point 94 may transmit, at a first time, a first signal indicating a first poll to a first group of devices in the power delivery system to allow the first group of devices to communicate data with the access point 94 during the assigned time slots of the first group (block 202).

The access point 94 may then receive poll responses from the devices in the first group (block 204). The access point 94 may then transmit, at a second time, a second signal indicating a second poll to a second group of devices in the power delivery system 20 to allow the second group of devices to communicate data with the access point 94 during assigned time slots of the second group (block 206). The second group of devices may be a separate group of devices from the first group. The devices may be grouped using any suitable method, such as proximity, commissioning order, randomly, or the like.

The access point 94 may then receive poll responses from devices in the second group (block 208). In some embodiments, the first and second groups of devices may respond to the poll requests by providing status information (e.g., heartbeat information), power system information, event information, or any other suitable data. This process may then continue for each of the groups in the supergroup (block 210). In conjunction with the embodiment illustrated in FIG. 5, the remaining two more groups in the supergroup may communicate with the access point in a similar manner. Following the communication of the polling request and polling responses of a supergroup, the access point 94 may transmit a data poll to allow larger messages of the supergroup to be communicated via the access point 94 (block 212). The access point 94 may repeat these steps for each of the remaining supergroups in the polling cycle (diamond 214). The polling cycle may be completed when each device in the communication network has an opportunity (e.g., timeslot) to communicate.

The access point 94 may associate the data received at the time slots of the devices with devices assigned to the time slots (block 216). For example, if an event is detected at FCI 82, an event notification received by the access point 94 at the time slot assigned to FCI 82 may be associated with the FCI 82 (e.g., without communicating sender identification data).

The access point 94 may then provide device-specific notifications based on the poll responses (block 218). For example, the access point 94 may send, to one or more computing devices of the central monitoring station 96, power system data of the power delivery system 20 that is specific to the device communicating the data. In certain embodiments, the access point 94 may provide the received data to the computing device of the central monitoring station 96 to allow the central monitoring station 96 to display power system data (e.g., voltages, currents, events, settings, etc.) on a display screen. Further, the data may be associated with the location and/or identification of the electronic device to allow for analysis of the power delivery system 20. In the example above, the access point 94 may associate event data communicated from FCI 82 with the FCI 82 based on the time slot in which the data is communicated, which may then be used to shed loads and/or shed generation based on the location of the FCI 82. For instance, the central monitoring station 96 may send a signal to open a circuit breaker on power line 46 upon detection of an overcurrent event by FCI 82 that is communicated at the time slot of FCI 82.

In some embodiments, the access point 94 may perform processing of the data and provide the processed data to the central monitoring station 96 based on the data in the poll responses. For example, the access point 94 may compare the current measurements to preset conditions and provide a notification that an overcurrent event occurred to a computing device of the central monitoring station 96 to display the overcurrent event to an operator on a display screen at the central monitoring station 96. The central monitoring station 96 may then perform control actions (e.g., load shedding, generation shedding, etc.) based on which devices detected the event.

Figure 7:
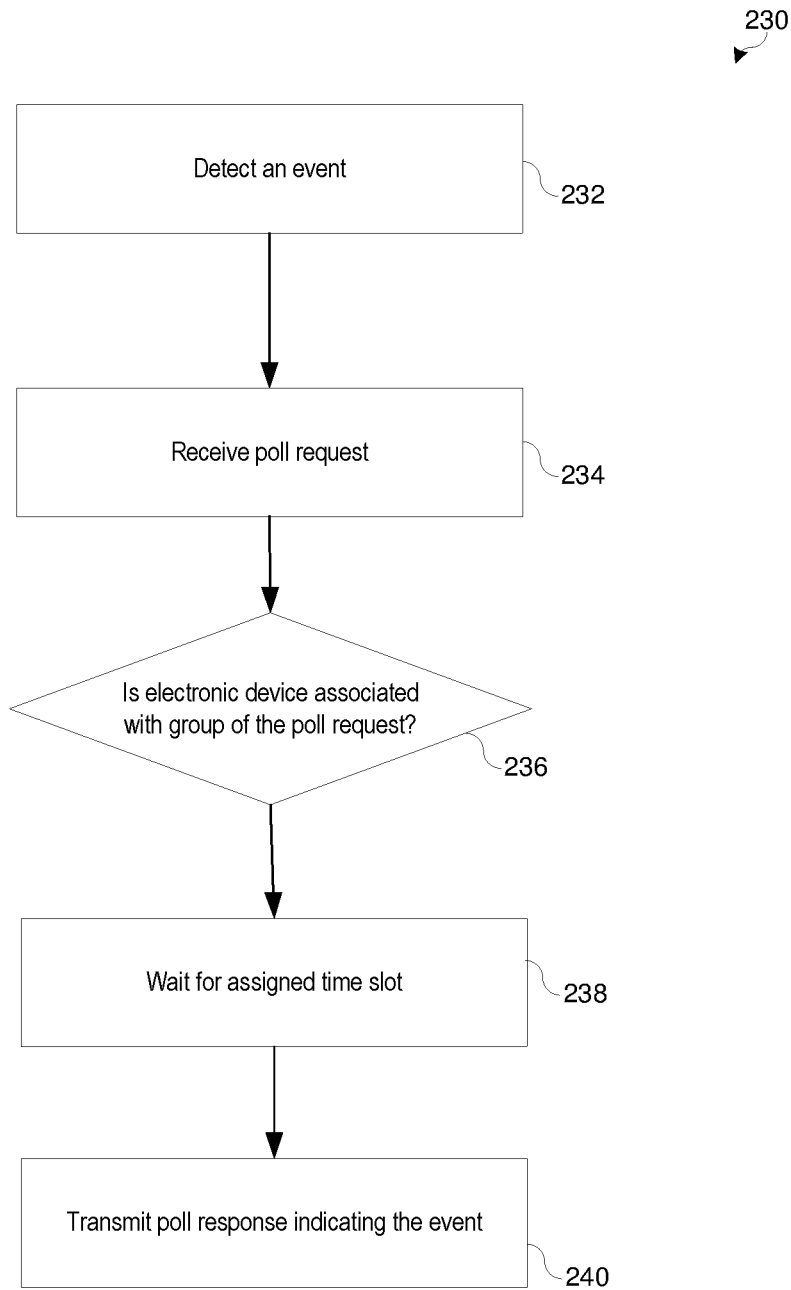
FIG. 7 illustrates a flow diagram of a process performed by an electronic device of FIG. 1, in accordance with an embodiment.

FIG. 7 is a flow diagram of a process 230 that may be performed by an electronic device of the power delivery system 20. The electronic devices may be assigned a time slot and a group in which to respond to poll requests. For example, the electronic device may be assigned a time slot based on the member identification and the group identification of the electronic device. In some embodiments, the electronic device may acquire the assigned time slot during installation. Alternatively, the electronic device may receive, via the communication network 120, the assigned time slot from the access point 94.

The electronic device may detect an event (block 232). The electronic device may receive a poll request from the access point 94 (block 234). The poll request may be a request of information from the electronic devices in the group of the poll. For example, the poll request may be a request of power system data (e.g., voltages, currents, etc.), power system settings, electronic device status, or the like. If the electronic device that detected the event is not in the group being polled (diamond 236), the electronic device may continue listening for additional poll requests.

If the electronic device is in the group being polled, the electronic device may wait to respond to the polling request until the assigned time slot (block 238). In some embodiments, the electronic device may sleep and/or operate in a lower power mode when not communicating data or obtaining measurements to conserve energy. When the time following the poll request matches the assigned time slot of the electronic device, the electronic device may transmit a poll response (block 240). Following transmission of the poll response, the electronic device may return to the lower power mode and/or sleep. The electronic device may conserve more power than a device that communicates in a packet-based system in which the electronic device may have communication conflicts with other electronic devices.

Figure 8:
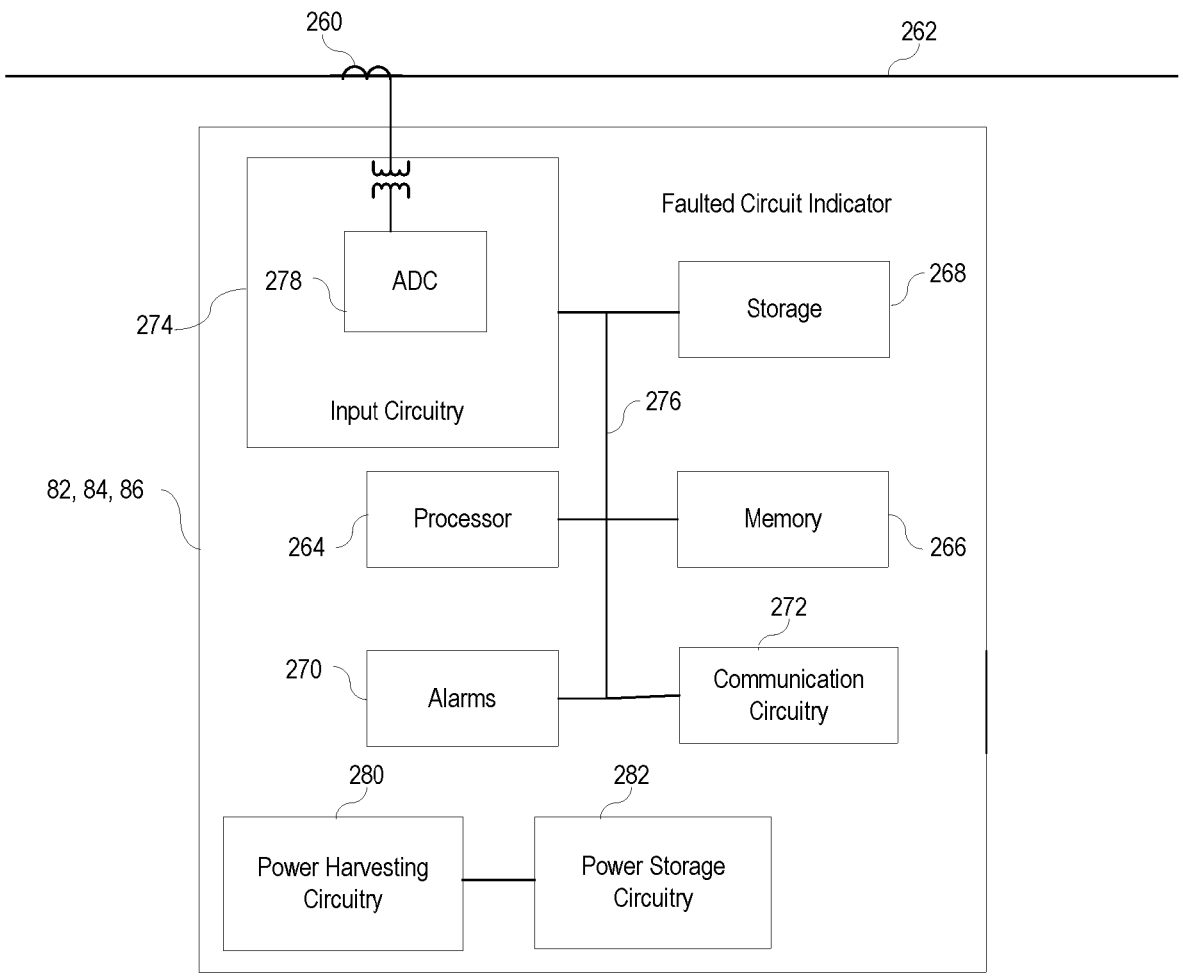
FIG. 8 illustrates a block diagram of an electronic device and the access point in the electric power delivery system of FIG. 1, in accordance with an embodiment.
Figure 8:
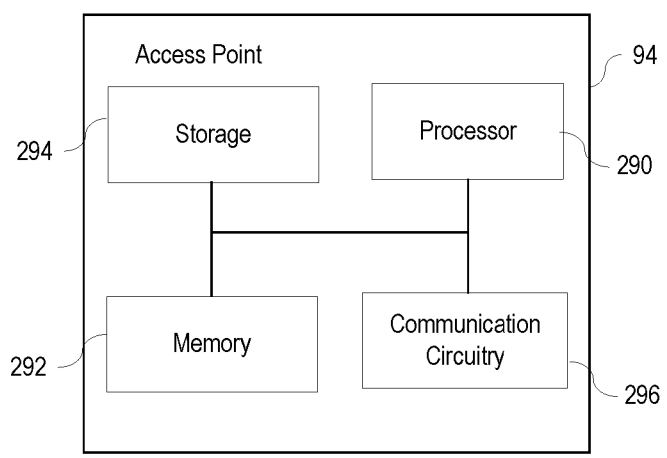

FIG. 8 is a block diagram of an electronic device, such as the FCIs 82, 84, and 86, and the access point 94. The electronic device may include a controller, such as a microcontroller. The electronic device may include sensor circuitry, such as a current transformer 260, operatively coupled to the power line 262 such that current through the power line 214 induces current through the current transformer 260 proportional to current through the power line 214.

The electronic device may include one or more processor(s) 264, memory 266 and/or nonvolatile storage 268, one or more alarms 270, communication circuitry 272, input circuitry 274, or any combination thereof. Each of the processor 264, the memory 266, the storage 268, the alarms 270, the communication circuitry 272, and the input circuitry 274 may be communicatively coupled by one or more communication busses 276.

In the illustrated embodiment, the electronic device includes one or more analog to digital (A/D) converters 278 that receive an analog signal of the current from the current transformer 260 and convert the analog signal into a digital signal. The A/D converter 278 may multiplex, sample, and/or digitize the current and/or voltage signals to form corresponding digitized current measurements. The A/D converter 278 may provide the current measurements to the processor 264 via the communication bus 276.

The processor 264 and/or other data processing circuitry may be operably coupled with the memory 266 and/or the nonvolatile storage 268 to perform various operations described in conjunction with FIGS. 3-7. Such programs or instructions executed by the processor 264 may be stored in one or more tangible, computer-readable media at least collectively storing the instructions or routines, such as the memory 266 and the nonvolatile storage 268. The memory 266 and the nonvolatile storage 268 may include any suitable articles of manufacture for storing data and executable instructions, such as random-access memory, read-only memory, rewritable flash memory, hard drives, or any other suitable optical, magnetic, or solid-state storage medium, or a combination thereof.

In some embodiments, the processor 264, the memory 266, and/or the nonvolatile storage 268 may be implemented as hardware components, such as via discrete electrical components, via a field programmable gate array (FPGA), and/or via one or more application specific integrated circuits (ASICs). The processor 264 may be embodied as one or more general-purpose microprocessors, one or more special-purpose microprocessors, a general purpose integrated circuit, an ASIC, an FPGA, and/or other programmable logic devices. In some embodiments, the processor 264, the memory 266, and/or the nonvolatile storage 268 may be referred to generally as processing circuitry.

The input circuitry 274, such as the A/D converter 278, may be operatively coupled to the processor 264 (e.g., via the communication bus 272 or another bus), through which digitized representations of current signals may be transmitted to the processor 264. The processor 264 may detect and analyze events on the power line 262 based on the digitized representations of current using instructions stored in the memory 266. In certain embodiments, the processor 264 may send a signal to the alarm 270 to indicate an event (e.g., overcurrent, undercurrent, etc.) occurrence. The alarm 270 may provide an audio alert, a visual alert (e.g., LEDs), or the like. The processor 264 may send a signal to the communication circuitry 272 to output a wireless signal to the access point 94 to indicate that an event on the power line 214, such as an overcurrent event, an undercurrent event, or the like, has occurred. The communication circuitry 228 may include a transceiver that receives and/or transmits data to enable the processor 220 to communicate with other electronic devices.

The processor 220 may communicate with the access point 94 via radio signals sent/received by the transceiver. The electronic device 210 may include power harvesting circuitry 260 (e.g., the current transformers 212 coupled to the power line 158, photovoltaic cells, etc.) and/or power storage circuitry 262 (e.g., battery cells) to store, for example, the harvested energy. The power harvesting circuitry 260 and/or the power storage circuitry 262 may power to the electronic device to enable the electronic device to monitor the power line 262 and communicate data to the access point 94.

The power harvesting circuitry 280 of the electronic device may be limited in which the electronic device is powered via the current transformer 260 or another current transformer without being directly electrically coupled to the power grid. That is, alternating current on the power line 262 may produce a magnetic field that magnetically induces alternating current in the current transformer 260, harvested by the power harvesting circuitry 280, to power each of the operations of electronic device without additional sources of power other than the power harvesting circuitry 280 and/or the power storage circuitry 282 (e.g., without directly conducting electrical energy via a conductor directly electrically coupled to the power grid). In other embodiments, the power harvesting circuitry 280 may harvest power via photovoltaic cells. The power storage circuitry 282 may include one or more battery cells, capacitors, supercapacitors, or the like, to store energy from the power harvesting circuitry 280 to power the electronic device. In some embodiments, the electronic device may perform each of the operations described herein using power from the power harvesting circuitry 280 and/or power storage circuitry 282 without additional power sources.

The access point 94 may include a processor 290, memory 292, nonvolatile storage 294, and/or communication circuitry 296(e.g., transceiver), as described above with respect to the electronic device. The processor 290 may execute instructions stored on the memory 292 and/or the nonvolatile storage 294, as described with respect to the similar aspects of electronic device, to execute the processes described in conjunction with FIGS. 3-7. While an order of steps is described in conjunction with FIGS. 6 and 7, this is meant to be illustrative and other embodiments may have different orders or sets of steps.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An access point configured to communicate power system data in a communication network of a power delivery system, comprising:
   communication circuitry configured to communicate with an access point in the communication network of the power delivery system;
   memory; and
   at least one processor operatively coupled to the memory, wherein the at least one processor is configured to:
   send, at a first time, a first signal indicating a first poll to a first group of devices in the power delivery system to allow the first group of devices to communicate data to the access point during assigned time slots of the first group of devices, wherein a first device of the first group of devices is assigned a first time slot of the first group of devices and a second device of the first group of devices is assigned a second time slot of the first group of devices; and
   send, at a second time following the first time, a second signal indicating a second poll to a second group of devices, separate from the first group of devices, in the power delivery system to allow devices of the second group of devices to communicate data to the access point during assigned time slots of the devices of the second group of devices following the second poll, wherein a third device of the second group of devices is assigned a third time slot of the second group of devices and a fourth device of the second group of devices is assigned a fourth time slot of the second group of devices.

2. The access point of claim 1, wherein the at least one processor is configured to:
   send, at a third time following the second time, a third signal indicating a third poll to the first group of devices to allow the first group of devices including the first and second devices of the first group of devices to communicate data to the access point during the assigned time slots of the first group of devices including the first and second time slots of the first group of devices;
   send, at a fourth time following the third time, a fourth signal indicating a fourth poll to the second group of devices to allow the second group of devices including the third and fourth devices to communicate data to the access point during the assigned time slots of the devices of the second group of devices including the third and fourth time slots of the second group of devices;
   wherein the access point is configured to receive, during the assigned time slots of the first group of devices following the third poll, a signal indicating an event that is detected by the first device of the first group of devices after the first poll was transmitted and to receive, during the assigned time slots of the second group of devices following the fourth poll, a signal indicating an event that was detected by the third device of the second group of devices after the second poll was transmitted.

3. The access point of claim 1, wherein the at least one processor is configured to:
   send, at a fifth time following the second time, a data poll indicating that a larger message is to be sent to or received by one or more of the devices in the first group of devices, the second group of devices, or both; and
   send or receive the larger message.

4. The access point of claim 3, wherein the larger message comprises a firmware update, management information, management commands, configuration data, or any combination thereof.

5. The access point of claim 3, wherein the at least one processor is configured to schedule, via the first poll and the second poll, communication of the larger message.

6. The access point of claim 3, wherein the access point is configured to communicate with the first group of devices and the second group of devices in a first supergroup and to communicate with a third group of devices and a fourth group of devices in a second supergroup, wherein each supergroup has a separate data poll and separate larger message time slots.

7. The access point of claim 1, wherein the at least one processor is configured to complete a polling cycle by polling each supergroup in the power delivery system.

8. The access point of claim 1, wherein the processor is configured to acquire the assigned time slots during commissioning of the network, during adding or removing a device onto the power delivery system, or any combination thereof.

9. The access point of claim 8, wherein the assigned order is based on a member identification of each device of the respective group of devices.

10. The access point of claim 8, wherein the assigned order is a static order during a poll cycle.

11. The access point of claim 1, wherein the access point comprises a fault and load receiver (FLR) configured to communicate with a plurality of faulted circuit indicators (FCIs) in the first group of devices and the second group of devices.

12. The access point of claim 1, wherein the at least one processor is configured to transmit an indication of an event and the device associated with the time slot in which the event is communicated to a computing device of a central monitoring station to allow the computing device to display a notification of the event on a display screen at the central monitoring station.

13. A method, comprising:
assigning a first set of electronic devices in a power delivery system to time slots of a first group;
assigning a second set of electronic devices in the power delivery system to time slots of a second group;
sending a first poll to the first group to allow the first group to communicate data to an access point of the power delivery system during the assigned time slots of the first group, wherein a first electronic device of the first set of electronic devices is assigned a first time slot of the first group and a second electronic device of the first set of electronic devices is assigned a second time slot of the first group; and
sending a second poll to the second group to allow the second group to communicate data to the access point during the assigned time slots of the second group, wherein a third electronic device of the second set of electronic devices is assigned a third time slot of the second group and a fourth electronic device of the second set of electronic devices is assigned a fourth time slot of the second group.

14. The method of claim 13, comprising:
assigning the first set of electronic devices to time slots of the first group based on a member ID of the electronic devices of the first set of electronic devices.

15. The method of claim 13, comprising:
receiving an indication of an event from the first electronic device of the first group during the time slots of the first group; and
associating the first electronic device with the event based at least in part on the time slot of the first group and the first group.

16. The method of claim 13, wherein the time slots assigned to the electronic devices of the first group and the time slots assigned to the electronic devices of the second group are stored in memory of the access point.

17. The method of claim 13, comprising communicating an event to the access point with a bounded delay of a polling cycle and a group poll.

* * * * *